United States Patent [19]
Nagashima et al.

[11] Patent Number: 5,276,557
[45] Date of Patent: Jan. 4, 1994

[54] DIGITAL RECORDING/REPRODUCING APPARATUS

[75] Inventors: Satoru Nagashima, Maebashi; Takao Kawasaki, Gunma, both of Japan

[73] Assignee: Victor Company of Japan, Ltd., Yokohama, Japan

[21] Appl. No.: 15,679

[22] Filed: Feb. 9, 1993

Related U.S. Application Data

[63] Continuation of Ser. No. 468,740, Jan. 23, 1990, abandoned.

[30] Foreign Application Priority Data

Jan. 24, 1989 [JP] Japan .................................. 1-14570

[51] Int. Cl.⁵ .............................................. H04N 5/78
[52] U.S. Cl. ...................................... 360/10.3; 360/32; 360/51
[58] Field of Search .................. 360/32, 10.3, 48, 10.1, 360/32, 48, 51; 341/110, 144; 375/27; 358/312

[56] References Cited

U.S. PATENT DOCUMENTS

| | | | |
|---|---|---|---|
| 4,536,741 | 8/1985 | Farah ..................................... | 375/27 |
| 4,617,599 | 10/1986 | Noguchi et al. ...................... | 360/51 |
| 4,905,104 | 2/1990 | Okamoto et al. ..................... | 360/32 |

Primary Examiner—Andrew L. Sniezek
Attorney, Agent, or Firm—Jacobson, Price, Holman & Stern

[57] ABSTRACT

A digital recording apparatus has a transporter and processor. (1). Long play mode: The transporter rotates heads and transports a recording medium at each first speed. The processor converts a first input signal supplied at a normal transfer speed with A/D conversion at a first sampling frequency to generate a first data of a quantization levels, converts the first data to a second data of a quantization levels with a first clock frequency and processes the second data which is supplied to the heads so as to be recorded in the medium. (2). High recording mode: The transporter rotates the heads and transports the medium at each second speed which is N times faster than the first. The processor has a converter to convert a second input signal supplied at a transfer speed which is N times faster than the normal to a third signal having a second sampling frequency which is N times higher than the first and to process the third signal with a second clock frequency which is N times higher than the first to supply the third signal to the heads so as to record the third signal in the medium.

3 Claims, 3 Drawing Sheets

DIGITAL RECORDING/REPRODUCING APPARATUS

This is a continuation of application Ser. No. 07/468,740, filed Jan. 23, 1990 which was abandoned upon the filing hereof.

BACKGROUND OF THE INVENTION

This invention relates to a digital recording apparatus applicable to such as a digital audio tape recorder (hereinafter abbreviated in a DAT).

Table 1 shows the values of a sampling frequency, a clock frequency for signal processing, a drum rotating speed and a tape speed in each mode of a conventional DAT (a rotary-head digital audio tape recorder) and the DAT of the present invention.

Firstly, in the case of recording in the conventional industry standard mode, a magnetic tape is transported at a standard speed of 8.15 mm/sec and a drum provided with a pair of rotary heads is rotated at a standard speed of 2000 r.p.m.

Analog input signals such as audio signals of two channels L and R, are converted to Pulse-Code Modulation (PCM) data of 16-bit quantization by A/D conversion with a sampling frequency of 48 kHz.

The PCM data are processed with specific data processing, modulation, etc. with a clock frequency f for signal processing.

The processed data are alternately supplied to the pair of rotary heads to be recorded on an inclined track being formed on a tape.

In the case of reproducing, reproducing signals generated by the rotary heads with the standard drum rotation speed and tape speed the same as in the case of recording are demodulated and decoded with the clock signal f to be the original audio signals.

mode, and the drum rotation speed to be the same as that of the standard mode.

Next, it will be considered to perform double-speed dubbing with the aim of halving the recording time by combining the DAT with such as a compact disk (CD) player. In other words, it will be considered that the CD player performs double-speed reproducing to reproduce audio signals whose transfer speed is two times faster than the normal reproduction speed and the reproduced audio signals are supplied to the DAT to conduct high-speed recording.

In order to perform recording by such a method and reproducing of the recorded signals with normal speed by the conventional DAT, the frequencies and speeds are set as follows.

In the case of recording, the sampling and clock frequencies and also the drum rotation and tape speeds are set to be double of the standard mode, that is, 96 kHz, 2f, 4000 r.p.m. and 16.3 mm/sec, respectively.

In the case of reproduction, the clock frequency and also the drum rotation and tape speeds are the same as those for the standard mode.

In the conventional digital recording apparatus explained above, the maximum signal processing capabilities required in each of the standard, long play and double-speed modes to perform recording are calculated as follows.

the standard mode: 48 kHz × 16 bits × 2 channels = 1536 kbits/sec the long play (×2) mode: 32 kHz × 12 bits × 2 channels = 768 kbits/sec the double-speed mode: 96 kHz × 16 bits × 2 channels = 3072 kbits/sec Therefore, double-speed recording by means of the conventional digital recording apparatus results in large capacity-signal processing circuits which leads inevitably to an increase in cost.

TABLE 1

| | CONVENTIONAL DAT | | | | | | DAT OF THIS INVENTION HIGH SPEED MODE | |
|---|---|---|---|---|---|---|---|---|
| | STANDARD MODE | | LONG PLAY MODE | | DOUBLE SPEED MODE | | | |
| | RECORD-ING | REPRO-DUCING | (time: × 2) RECORDING | REPRO-DUCING | RECORD-ING | REPRO-DUCING | (speed: × 2) RECORDING | REPRO-DUCING |
| SAMP FREQ | 48 kHz | | 32 kHz | | 96 kHz | | 64 kHz | |
| CLOCK FREQ FOR SIGNAL PROCESSING | f | f | f/2 | f/2 | 2f | f | f | f/2 |
| DRUM ROTATING SPEED | 2000 r.p.m. | 2000 r.p.m. | 1000 r.p.m. | 2000 r.p.m. | 4000 r.p.m. | 2000 r.p.m. | 2000 r.p.m. | 2000 r.p.m. |
| TAPE SPEED | 8.15 mm/sec | 8.15 mm/sec | *4.075 mm/sec | *4.075 mm/sec | 16.3 mm/sec | 8.15 mm/sec | 8.15 mm/sec | *4.075 mm/sec |

*A tape speed is half that of the standard mode.

Furthermore, the case of recording in the long play mode of the well known DAT in which the recording time is two times longer than that of the standard mode for the same length of the tape will be explained.

In this case, the sampling frequency is set to be 32 kHz, and the drum rotation speed and the tape speed half of the standard mode, respectively.

The PCM data of 16-bit quantization which are converted by A/D conversion with the sampling frequency of 32 kHz are converted to be 12-bit quantization data by nonlinear quantization so as to maintain the dynamic range. After the conversion, the 12-bit data are processed by specific signal processing.

In the case of reproduction, the clock frequency and the tape speed are set to be half those of the standard

SUMMARY OF THE INVENTION

It is accordingly an object of this invention to provide a digital recording apparatus capable of high speed recording and employing signal processing circuits of the same capacity as conventional circuits so as to overcome the problems mentioned above.

The apparatus comprises, firstly in the long play mode, (a) a transport device for rotating heads at a first rotation speed which is half that of a standard mode and for transporting a recording medium at a first transport speed which is half that of the standard mode;

(b) a signal processing circuitry for converting a first input signal supplied at a normal transfer speed by A/D conversion at a first sampling frequency lower than that of the standard mode to generate a first data of a specified quantization levels, further converting the first data to a second data of fewer quantization levels than the specified quantization levels by using a first clock frequency which is half that of the standard mode, and then processing the second data in a first predetermined signal processing to produce a third data to be supplied to the heads so as to record the second data in the recording medium being transported at the first transport speed; and further, comprises in the high speed recording mode, (c) the transport device for rotating the heads at a second rotation speed which is N times faster than the first rotation speed and also transporting the recording medium at a second transport speed which is N times faster than the first transport speed;

(d) the signal processing circuitry having a converting circuit for converting a second input signal supplied at a transfer speed which is N times faster than the normal transfer speed to a converted signal having a second sampling frequency which is N times higher than the first sampling frequency and for processing the converted signal in a second predetermined signal processing by using a second clock frequency which is N times higher than the first clock frequency to produce a recording signal to be supplied to the heads so as to record the recording signal in the recording medium being transported at the second transport speed (N being a positive integer number of two or more than two); and (e) a reproducing device for transporting the recording medium where the recording signal is recorded in the high speed recording mode to reproduce the recording at the normal transfer speed.

According to this invention, the signal processing capability in such as double-speed high speed mode, by employing each value already explained, is 64 kHz × 12 bits × 2 channels = 1536 kbits/sec.

This equals the signal processing capability in the standard mode.

DETAILED DESCRIPTION OF THE PREFERRED EMBODIMENTS

Figure 1:
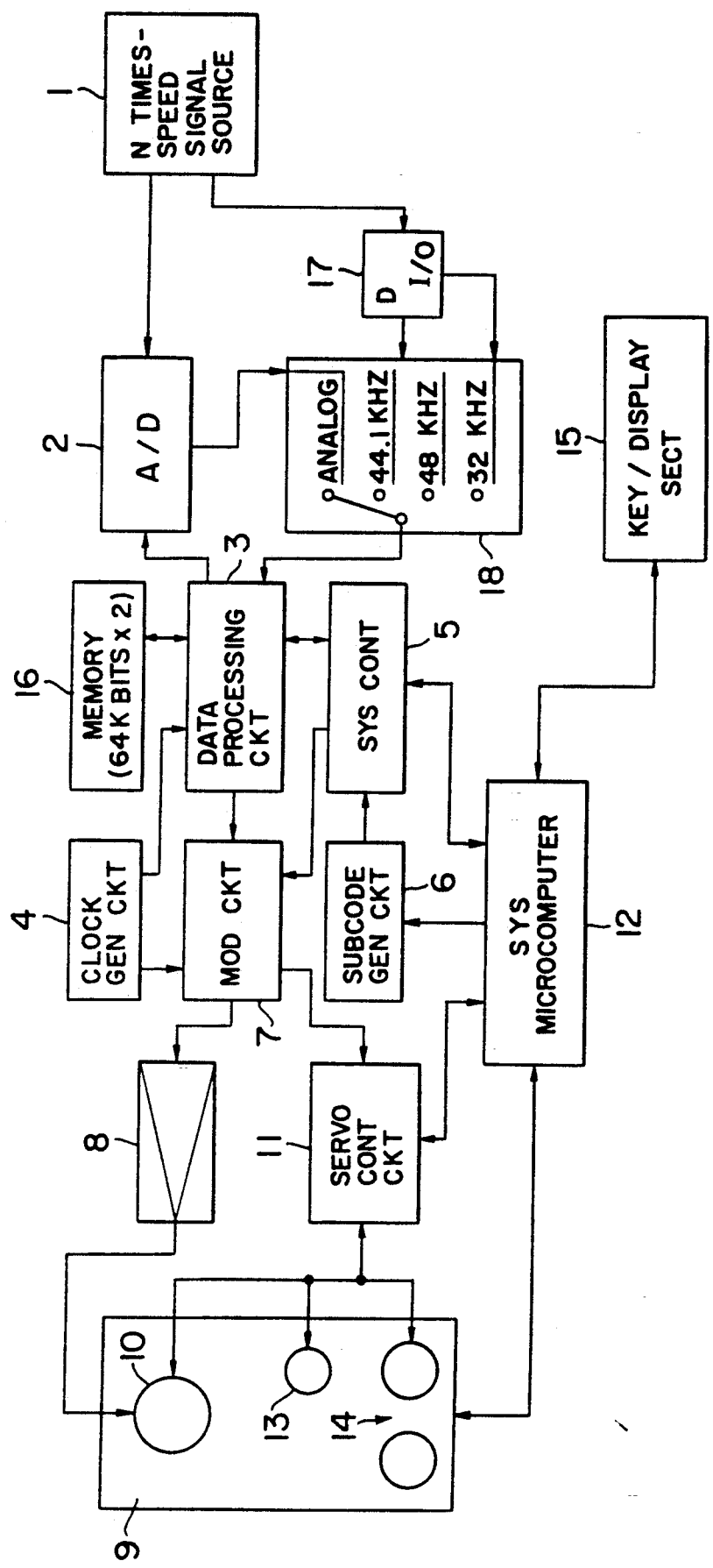
FIG. 1 shows a block diagram according to a preferred embodiment of this invention.

FIG. 1 shows an embodiment of a recording circuit which is a main section of a digital recording circuit according to this invention.

Firstly, as an example, it will be explained that an input signal is an analog signal which is supplied to the recording circuit at a transfer speed which is two times faster than the normal transfer speed.

The functions for the long play mode already explained, is used for performing high speed recording and reproducing of the tape which is recorded by the high speed recording according to this invention.

As is shown in Table 1, in the case of high speed recording in the double-speed mode, the sampling and signal processing frequencies and the drum rotation and tape speeds in the long play mode are doubled to be 64 kHz, f, 2000 r.p.m. and 8.15 mm/sec, respectively. With this, the 16-bit (quantization levels) data converted by A/D conversion are converted to the 12-bit data by nonlinear quantization.

When the tape recorded with 12-bit data is reproduced, the clock frequency and the drum rotation and tape speeds in the long play mode are used.

In FIG. 1, as an example of an N times-speed signal source 1, two-channel audio signals whose transfer speed is two times faster than normal and obtained in the case of double-speed reproducing in such as a CD player, are converted to the quantized PCM data of 16-bit quantization levels by means of 64 kHz sampling pulses supplied from a data processing circuit 3.

The data are supplied to the data processing circuit 3 through a bypass switch provided in a sampling frequency conversion circuit 18 and processed by means of clock pulses of frequency f supplied from a clock generation circuit 4 and the control of a system controller 5, to be converted to the nonlinearly quantized 12-bit data.

The 12-bit data are divided into data blocks each having a specified number of the data and interleaved. Subcode data according to the data format of the industry standards of the DAT generated by a subcode generation circuit 6, are added to the specified positions of the data signal through the system controller 5 in addition to error correction codes.

The data which are modulated by NRZ (Non-Return-to-Zero) modulation are supplied to a modulation circuit 7. The modulation circuit 7 performs the 8 to 10 conversion to convert the NRZ data of 1 symbol from 8-bit to 10-bit so as to reduce low frequency-components. The auto tracking finding signals to be the standard for tracking servo are also added to the specified positions of the data signal.

The output signals from the modulation circuit 7 are supplied an amplifier 8 to a rotary head (not shown) of a drum unit 10 including a drum motor (not shown) of a tape transport 9 and recorded on helical tracks on a tape (not shown).

Figure 2:
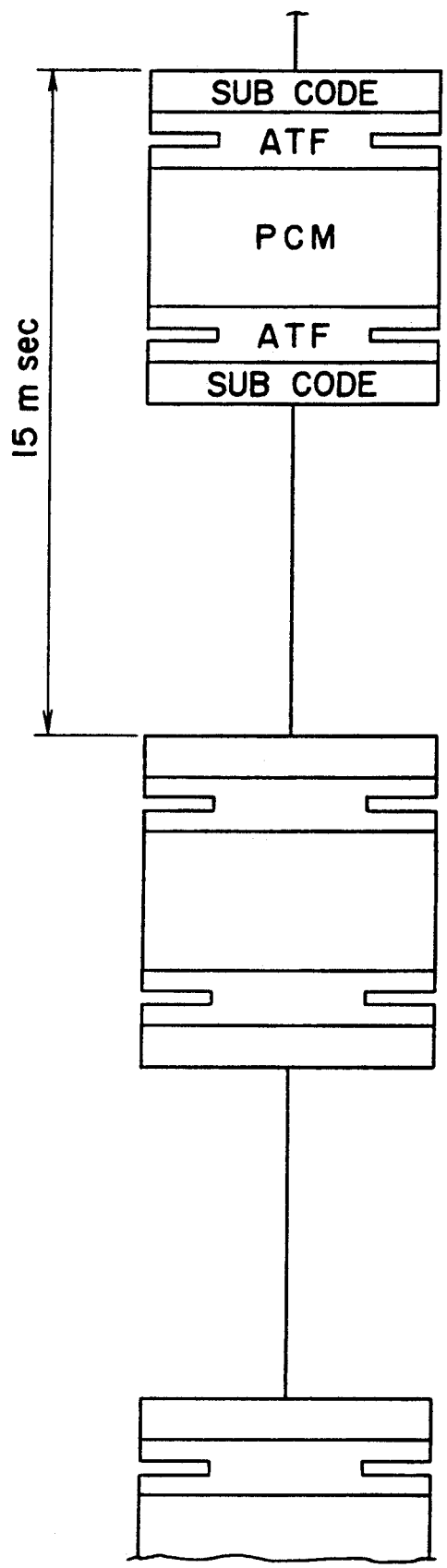
FIG. 2 shows the envelope of the recorded signals according to this invention.

FIG. 2 shows the envelope of the recorded signals. The subcode data, ATF signals, PCM data etc. are aligned with at specified positions on a track, respectively.

Again in FIG. 1, a servo control circuit 11 controls the drum motor of the tape transport 9, a capstan motor of a capstan unit 13, a reel motor of a reel unit 14, etc. (None of the motors are shown.) in response to the instructions from the modulation circuit 7, and a system microcomputer 12, etc. Accordingly, the drum rotation speed and the tape speed are set to be 2000 r.p.m. and 8.15 mm/sec, respectively which are two times faster than those of the long play mode (i.e. same as of the standard mode).

In response to key operation of a key/display section 15, the system microcomputer 12 controls the system controller 5, the subcode generation circuit 6, the tape transport 9, and the servo control circuit 11, etc. at specified timing. A memory 16 supports the processing operation of the data processing circuit 3.

In the case of reproducing, the tape recorded by the double-speed recording is reproduced by a reproducing circuit (not shown) at the clock frequency ½f, and drum rotation and tape speeds 2000 r.p.m. and 4.075 mm/sec, which are the same as the long play mode.

Accordingly, the signal processing capability required in the data processing circuit 3 and the modulation circuit 7 is 64 kHz × 12 bits × 2 channels = 1536 kbits/sec which is same as the standard mode.

The above mentioned case is the example for high speed recording mode wherein the data to be recorded are supplied to a recording circuit at a transfer speed of two times faster than that in the case of reproducing at normal speed.

The data may be supplied at a speed of N times and not two times. In the case of recording, the sampling frequency, the clock frequency for signal processing and drum rotation and tape speeds are set to be N times those of the long play mode (double playing time).

In order to reproduce, at the normal transfer speed, the data recorded in the tape by the N times speed recording, like for the reproducing of the tape recorded in the double speed, i.e., the clock frequency for signal processing f/2, drum rotation and tape speeds 2000 r.p.m. and 4.075 mm/sec respectively are used without modification of the reproducing arrangement for the long play mode reproduction.

Furthermore, the embodiment already described is the case for where the input signals are analog signals supplied at a transfer speed N times faster than the normal speed. The input signals may be digital signals supplied at the N times normal speed from the signal source 1.

In this case, as is shown in FIG. 1, the digital input signals are supplied to the sampling frequency-conversion circuit 18 through an I/O interface 17.

If the sampling frequency of such digital input signals is other than 64 kHz, then depending on its sampling frequency, the signals are converted to the digital signals with the sampling frequency of 64 kHz which is the same as the digital signals generated by the A/D converter 2 in the case of the analog signals, then processed in the data processing circuit 3. Each of the frequencies shown in the sampling conversion circuit 18 is the nominal sampling frequency of the respective digital input signals at its normal transfer speed, which is supplied through the digital I/O interface 17 at the high transfer speed.

Figure 3:
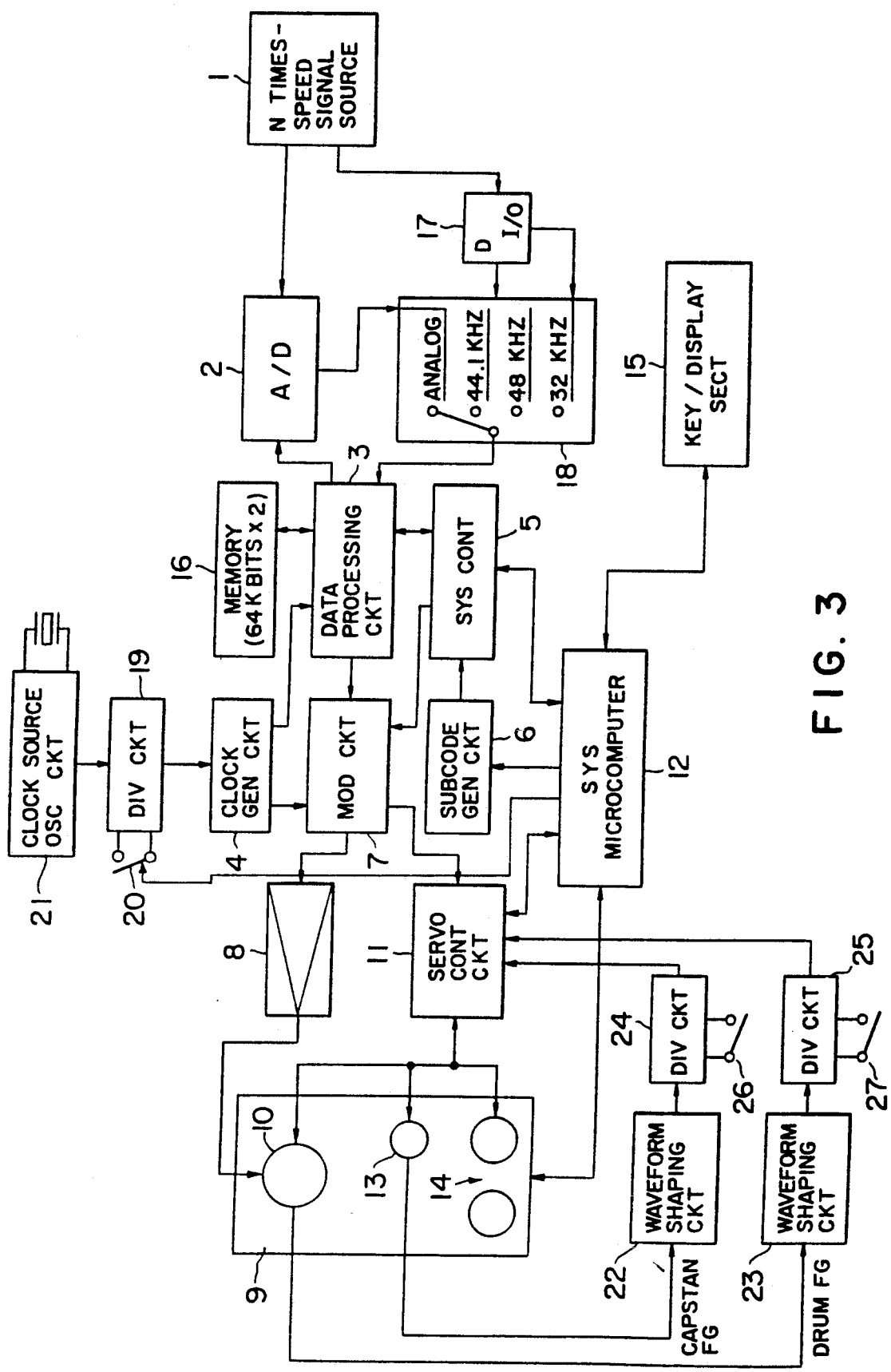
FIG. 3 shows another block diagram according to a preferred embodiment of this invention and based on a conventional digital recording apparatus in the long play mode.

FIG. 3 shows a more precise block diagram of the constitution of this invention, with which generation of the clock frequencies and speed control of the drum and tape by means of a capstan will be explained.

In the figure, a clock source-oscillation circuit 21, a dividing circuit 19 and a switch 20 for switching the operation of the dividing circuit 19 are separately shown from the block which has previously been a clock generation circuit 4.

The switch 20 is controlled by a system microcomputer 12 so as to operate the dividing circuit 19 to perform ½ dividing operation in case of the conventional recording/reproducing in the long play mode, but passes the signals from the clock source-oscillation circuit 21 in other cases including the case of high speed recording.

The circuit block including the dividing circuit 19, the switch 20 and the clock source-oscillation circuit 21 is an example. The dividing ratio of the dividing circuit 19 may be switched into three steps in the case of various high speed recordings (N times speed) except for the double speed.

Furthermore, waveform shaping circuits 22 and 23, dividing circuits 24 and 25 and switches 26 and 27 for switching the operation of the dividing circuits 24 and 25 are separately shown from the block which has previously been a servo control circuit 11.

The switch 26 activates the dividing circuit 24 in the other modes than the conventional long play recording and reproduction so that the tape speed is controlled normal or faster in the other modes. The switch 27 activates the dividing circuit 25 in the other modes than the conventional long play recording so that the drum speed is controlled normal or faster in the other modes.

Drum FG and capstan FG are the signals which are generated from respective frequency generators (not shown) and are proportional in frequency to the rotational speeds of the drum 10 and the capstan 13, respectively.

It is therefore possible to perform high speed mode recording and normal speed reproducing of the signals recorded in the high speed mode, so that a higher cost performance ratio of the high speed mode recording apparatus is realized.

What is claimed is:

1. An apparatus for recording digital signals in a recording medium by means of a rotary head, the apparatus capable of operation in a standard mode at a first rotation speed, a first transport speed, a first sampling frequency and a first clock frequency, said apparatus capable of operating in a long play mode and a high speed record mode, the apparatus comprising:

transport means for rotating said rotary head; and signal processing means for converting an input signal to data in preparation for recording on said recording medium; wherein in the long play mode, said transport means for rotating the head means at a second rotation speed which is half that of a standard mode and for transporting the recording medium at a second transport speed which is half that of the standard mode;

said signal processing means for converting a first input signal supplied at a normal transfer speed at a second sampling frequency which is less than that of the standard mode to generate a first data defined by first quantization levels, and further converting said first data to a second data defined by second quantization levels which are fewer in number than the first quantization levels by using a second clock frequency which is half that of the standard mode, and then processing said second data according to a first predetermined signal processing to produce a third data to be supplied to said head means so as to record said third data in said recording medium transported at said second transport speed; and further, in the high speed recording mode, said transport means rotating said rotary head at a third rotation speed which is two times faster than said second rotation speed and also transporting said recording medium at a third transport speed which is two times faster than said second transport speed; and said signal processing means converting a second input signal supplied at a transfer speed which is two times faster than said normal transfer speed to a converted signal defined by said second quantization levels and a third sampling frequency which is two times greater than said second sampling frequency and processing said converted signal according to a second predetermined signal processing by using a third clock frequency which is two times greater than said second clock frequency to produce a recording signal to be supplied to said rotary head so as to record said recording signal in said recording medium.

2. An apparatus for recording digital signals as set forth in claim 1, wherein said signal processing means comprises an A/D converter which converts an analog input signal to said converted signal.

3. An apparatus for recording digital signals as set forth in claim 1, wherein said signal processing means comprises a sampling frequency converter which converts a sampling frequency for sampling a digital input signal to said third sampling frequency.

* * * * *